June 27, 1961

E. PASKELL 2,990,300

PROTECTIVE DEVICE

Filed Dec. 16, 1957

INVENTOR.

Ernest Paskell

BY Robert D. Silver

Attorney

United States Patent Office 2,990,300

Patented June 27, 1961

2,990,300

PROTECTIVE DEVICE

Ernest Paskell, Columbus, Ohio, assignor, by mesne assignments, to McGraw-Edison Company, Milwaukee, Wis., a corporation of Delaware Filed Dec. 16, 1957, Ser. No. 702,908
1 Claim. (Cl. 117—200)

The present invention relates to protective devices for electric circuits and is particularly directed to a method of obtaining an improved valve type lightning arrester. The method of providing an improved lightning arrester involves the following steps which will be explained in more detail hereinafter.

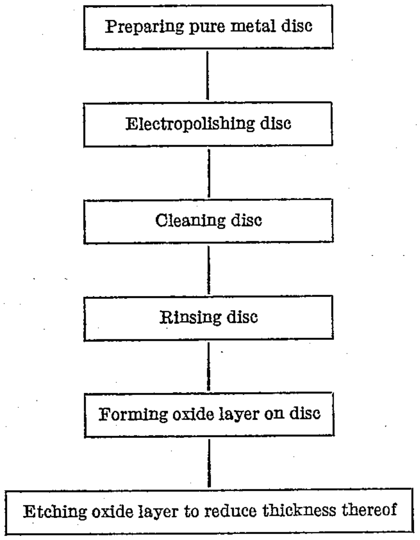

It has been known for a number of years that copper oxide rectifiers exhibit electronic lightning arrester action. However, the known copper oxide rectifiers have shown the following deficiencies at the rectifying junction, namely, a very high ohmic resistance of the copper oxide layer which reduces the nonlinearity of the junction and in turn, reduces the degree of protection obtainable in the lightning arrester. A second deficiency in prior art copper oxide rectifiers, as lightning arresters, has been the high ohmic resistance between the copper oxide layer and the metallic contact means or counter electrodes, said high ohmic resistance at this point also reducing the nonlinearity of the arrester to thereby reduce the degree of protection obtainable.

A further deficiency found in prior art copper oxide rectifiers as lightning arresters, was that rectifiers formed into discs having a large area have presented severe problems of obtaining a uniform copper oxide layer free from defects. Defects cause failure at low current density whereas high current densities are necessary for a rectifier disc size commercially feasible. It has further been observed that the larger the area of the rectifier discs, the more the probability of defects increases, said increase being at a very high nonlinear rate.

It is a general object of this invention to provide copper oxide rectifiers for lightning arrester protection wherein the high ohmic resistance of the copper oxide layer and between the copper oxide layer and the metallic contact or counterelectrode is kept at a minimum.

It is a further object of this invention to provide a copper oxide rectifier wherein the copper oxide layer is of a uniform nature to thereby give constant current characteristics at relatively high current densities.

The novel features that are characteristic of the invention are set forth with particularity in the appended claim; the invention itself, however, both as to its organization and its method of operation, together with additional objects and advantages thereof, will best be understood by the following description of the specific embodiment when read in connection with the accompanying drawings in which:

Figures 1, 2, 3, 4:
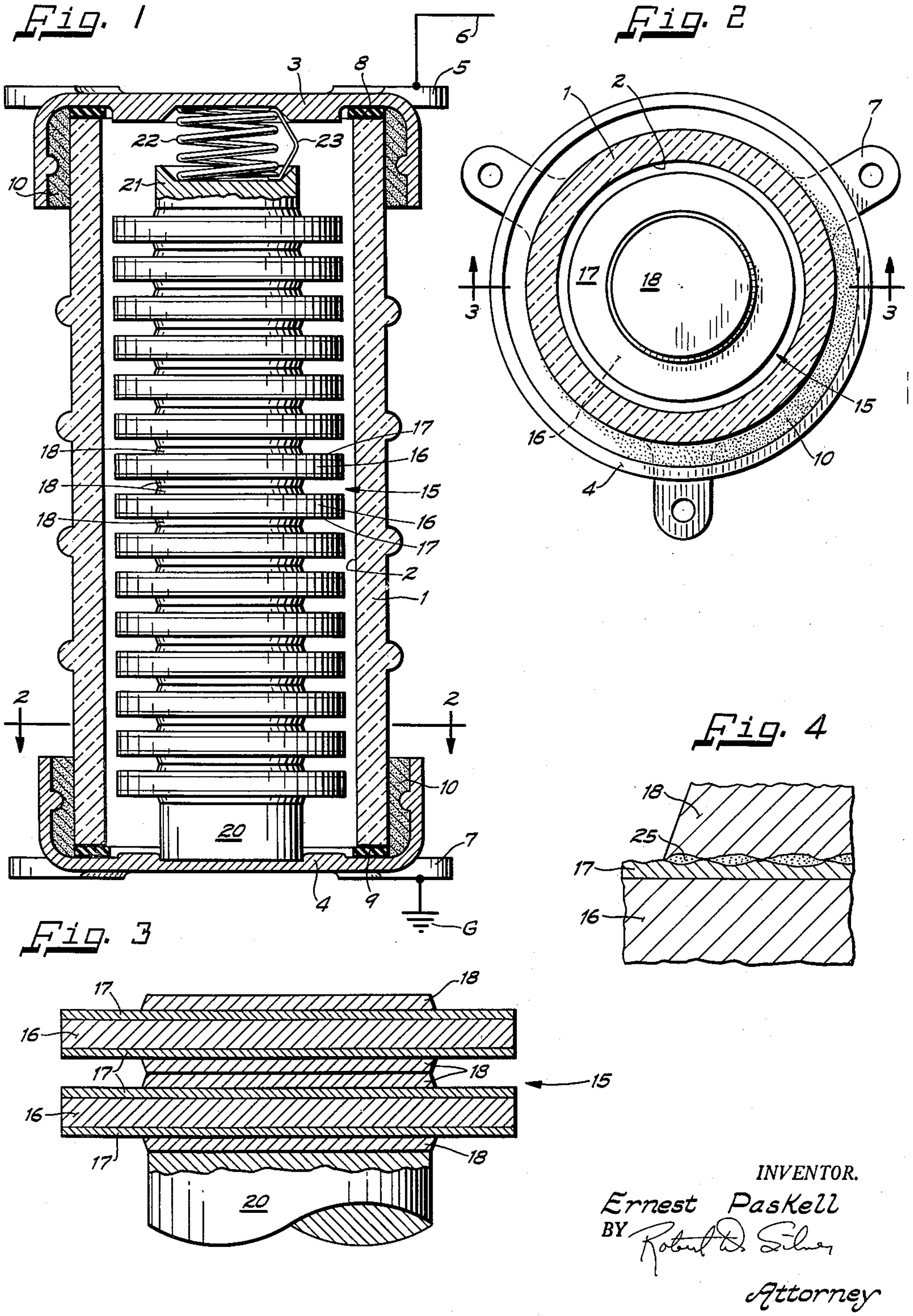
FIG. 1 is a vertical sectional view showing one form of a lightning arrester embodying copper oxide rectifying discs and suitable metallic counterelectrodes which form the present invention.
FIG. 2 is a cross sectional view taken along lines 2—2 of FIG. 1.
FIG. 3 is a fragmentary sectional view taken along lines 3—3 of FIG. 2.
FIG. 4 is a greatly enlarged fragmentary sectional view of a portion of FIG. 3.

In the embodiment illustrated, the lightning arrester includes an insulating housing 1 which may be of porcelain or glass material or the like. The housing preferably contains a coextensive bore 2 which may be closed at both ends by means of conducting terminal caps 3 and 4, which may be substantially identical to one another. The cap 3 includes laterally extending mounting and/or terminal lugs 5 having an aperture (not shown) for mounting purposes or for attachment with a connector for electrical connection with a power line 6 which is shown here semidiagramatically.

The conducting cap 4 may be connected with ground G by means of its laterally extending lug 7. The caps 3 and 4 are in sealing relationship with the housing by means of gaskets 8 and 9, respectively, and are each held in place by means of cement 10. Although the connections shown are preferred, it will not depart from the scope of the present invention to reverse the line and ground connections.

Contained within the bore 2 of the housing 1 are the operating components comprising a stack of rectifying plates shown generally by the reference numeral 15. The assembly 15 comprises a stack of a predetermined number of rectifier units, which are shown in relative enlargement in cross section in FIG. 3. These units are shown even further enlarged in fragmentary sectional view 4.

The rectifier units comprise a conducting disc 16 which is, in the case of the present embodiment, of pure copper. The disc is provided on both sides with the layer 17 of copper oxide. The base metal disc 16 is properly purified and prepared in accordance with any of the processes such as described in either Sharaviskiy on page 149, volume 12 of "Zhurmal Tekhnicheskoi and Fiziki," published in 1942 or an article by Mr. A. E. Middleton et al. at pages 4 and 647 of the "Physical Review," volume 86 published in 1952.

Metallic contact means 18 is provided to make electrical contact between the alternate layers of copper oxide. This metal contact means may take the form of a tin plated lead washer or the like. To secure a good contact and to reduce the ohmic resistance between the metallic contact means and the copper oxide layers, a layer 25 of a suitable concentration of colloidal dispersion of pure electric furnace graphite in water is used. One colloidal dispersion which has been found suitable is sold under the trade name "Aquadag" and which is of a paste consistency with a solid content of 22 percent, the average particle size being 0.5 micron with a maximum particle size of 4 microns, a specific gravity of 1.121, B.I.P. 100° centigrade, and is completely miscible with water.

As shown in the enlarged partial section of FIG. 4, the colloidal dispersion of graphite tends to fill the voids caused by the microscopic irregularities of the surfaces of the electrode 18 and the copper oxide layer 17, thus, increasing the area of contact and decreasing contact resistance.

As shown in the drawings, each of the rectifier units is placed in a stacked relationship relative to another substantially identical unit for a predetermined number of layers as shown in FIG. 1.

At the lower end of the stack as viewed in Fig. 1, there is provided a conductor metal spacer member 20 whereas a contact disc 21 is disposed at the opposite end. Contact disc 21 is preferably recessed to provide a means for retaining a compression spring 22 seated between the disc 21 and the upper terminal cap 3 to provide secure electrical engagement between each of the rectifier units.

It is preferable to provide a conducting shunt member 23 for bypassing the spring 22 thereby eliminating the inductive effects which might be incident to passing current through the helical spring.

Returning now to a more detailed discussion of the copper disc 16 and the copper oxide layers 17 disposed thereon, it is found that in order to get a more uniform layer of the copper oxide 17 upon the aforementioned disc 16, it is preferable to prepolish the copper disc by an electropolishing method. Any known electropolishing method that provides surfaces free from protuberances and depressions will suffice. One such method is taught in "Electrochemistry—Principles and Applications," by Edmund C. Potter (1956), on page 355. As is obvious the degree of electropolishing will largely depend upon the current density and the length of time this current is maintained. This prepolishing gives a smoother interfacial surface between copper disc 16 and the copper oxide layers 17 and also will help produce an oxide crystal growth that has fewer defects, said defects increasing leakage current and reducing permissible current density. After the electropolishing, the copper discs are cleaned with distilled water and then rinsed with 200 proof alcohol. This is substantially different from the usual method of cleaning which involves acid etching solutions. Since the electropolishing treatment essentially removes copper, the usual cleaning treatment is not considered necessary and, in fact, would defeat the purpose of the electropolishing. The copper oxide layers 17 are then formed on the copper disc 16 by standard techniques. These layers may be formed on the mother copper in accordance with any well-known processes employed in the manufacture of copper oxide rectifier elements since the seat for the oxide layer, as a smooth pre-polished surface, will enhance the uniformity of the oxide layer irrespective of the manner of application.

To improve the characteristics of the rectifiers, the ohmic resistance of the bulk layer of copper oxide 17 is reduced by removing a part of said copper oxide layer 17 by an acid etching process. It is further desired that not only should the bulk be reduced by the chemical etching but that the etching should also produce an oxide surface which is fairly highly polished for good contact with the counter electrodes 18. One such solution that is found to chemically etch and polish the copper oxide layer 17 was 15 ml. of $H_2SO_4$ (concentrated), and 2 ml. of HCl (concentrated) to 1,000 ml. $H_2O$. By the reduction of the bulk layer, the ohmic resistance is reduced and the nonlinearity of the rectifier is, thus, increased, this increase being useful at the higher currents before the linear ohmic contribution will predominate. The degree to which the oxide layer is reduced is dependent upon the desired rectifier nonlinearity and may be altered most easily by varying the time of contact between oxide and etching solution as is well known in the art. Further, since the IR drop across the relatively high resistivity layer of copper oxide 17 will also be reduced, there will now be less heating in said layer 17. Excess heating of the layer 17 enhances the incipient thermo-breakdown.

Although a specific embodiment of the invention has been shown and described, it is with full awareness that many further modifications thereof are possible. The invention, therefore, is not to be restricted except insofar as necessitated by the prior art and by the spirit of the appended claim.

What is claimed as the invention is:

In the method of manufacturing a lightning arrester to be directly connected between a source of high potential and ground without an air gap in series therewith of a metal oxide type having a layer of the metal oxide on a base metal disc, the improvement comprising the steps of electro-polishing the base metal disc prior to the oxidizing step to form a smooth, flat surface free from protuberances and depressions and etching the bulk oxide layer subsequent to the oxidizing step with acid to remove a portion of said bulk oxide layer and materially decrease the thickness thereof, whereby the ohmic resistance of the oxide layer is substantially decreased in the forward direction, leakage current in the reverse direction is minimized, and thermal breakdown due to non-uniformities of current distribution is avoided.

References Cited in the file of this patent

UNITED STATES PATENTS

| | | |
|---|---|---|
| 1,640,335 | Grondahl | Aug. 23, 1927 |
| 1,776,217 | Dooley | Sept. 16, 1930 |
| 1,892,832 | Geiger | Jan. 3, 1933 |
| 2,046,686 | Kannewberg | July 7, 1936 |
| 2,165,029 | Bourland | July 4, 1939 |
| 2,352,283 | Overholt | June 27, 1944 |
| 2,785,992 | Dabravalski | Mar. 9, 1957 |